Oct. 12, 1965  A. PALAMENTI  3,211,066
ROTARY SLOTTING APPARATUS
Filed Dec. 3, 1963  2 Sheets-Sheet 1

INVENTOR.
ALBERT PALAMENTI
BY Oscar B Brumback
his Attorney

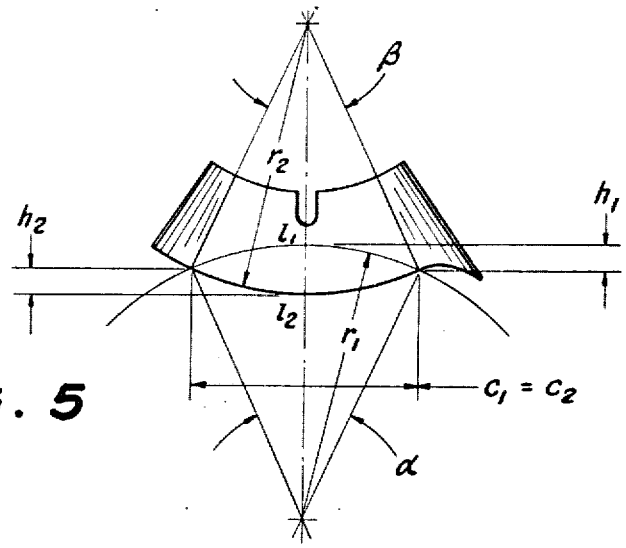
FIG. 5
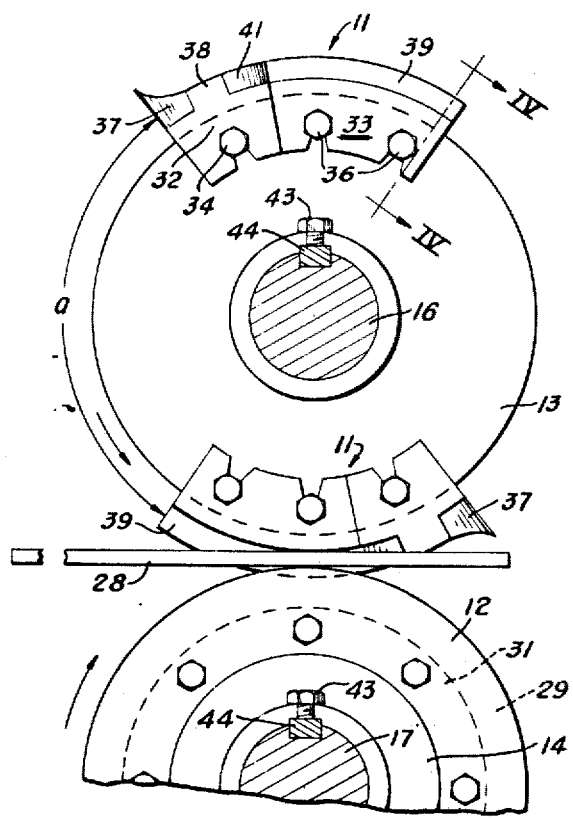
FIG. 3
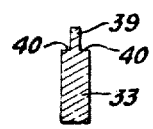
FIG. 4
FIG. 2
INVENTOR.
ALBERT PALAMENTI
BY Oscar B Brumback
his Attorney Patented Oct. 12, 1965

3,211,066
ROTARY SLOTTING APPARATUS
Albert Palamenti, Saddle Brook, N.J., assignor to Koppers Company, Inc., a corporation of Delaware
Filed Dec. 3, 1963, Ser. No. 327,760
5 Claims. (Cl. 93—58.2)

This invention relates to the rotary type of cutting blades for slotting paperboard blanks to form packaging cartons or crates and is a continuation-in-part of my prior application Serial No. 148,200 (now abandoned).

In the manufacture of cartons, a paperboard blank is fed between pairs of coacting upper and lower slotting heads which selectively cut slots in the leading and trailing edges of the blank. These slots define the flaps which are later folded over to form the top and bottom of the container or carton made from the paperboard blank. Each of the upper slotting heads is usually provided with two or more angularly spaced male slotting blades and each of the lower heads is provided with a pair of axially spaced, annular cutting discs which form a peripheral groove or female cutting edges for receiving the cutting edges of the upper male slotting blades.

For the flaps to interfit properly, the slots must be cut cleanly. To obtain such cuts, the practice heretofore has been to fit the male blades between the female discs with no side clearance. Gradual misalignment, however, occurs between the coacting pairs of slotting heads during continuous slotting operations. The upper male blades are not continuous around the entire periphery of the blade head so the foremost edge of the leading male blades hit upon the continuous cutting edges of the female blades whenever any slight misalignment exists between them. Thus, chipping of the cutting edges of the male and female cutting blades results when the male blades enter the grooves formed by the female cutting discs during each complete revolution of the upper slotting head. Also, the metal-to-metal contact between the blades during misaligned rotation results in an uneven wearing down of the blade edges, requiring that they be replaced more frequently than is desirable.

Knowlton Patent No. 1,963,369 has, for example, described the use of springs to maintain the female discs in contact with the male knife. The arrangment is cumbersome, requires a complex biasing mechanism for the female blades, and an entry portion on the male blade to spread the discs for entry by the knife. The general arrangement relies upon metal-to-metal contact of the male and female knives and then the disadvantages attendant thereto are still present.

It has now been found unexpectedly that relatively large clearances between the edges of the cutting members promote the cutting of cleaner slots than have heretofore been known. The lack of metal-to-metal contact gives an indefinitely long life to the blades.

The invention contemplates a cutter for carton blanks where a male slotting blade secured to the upper head of an oppositely arranged pair of blade heads passes between a pair of parallel annular female cutting discs in fixed spaced relation secured to the lower head of each pair of blade heads with a substantial clearance between the male knife and the female cutting disc whereby metal-to-metal contact is eliminated.

Substantial clearance in accordance with this invention means a clearance between a side of the male knife and the corresponding side of the female disc of 0.003 to 0.007 inch. This range of clearance is quite critical. At clearances less than 0.003 inch, the quality of the cut decreases and a great tendency for metal-to-metal contact exists with the disadvantages discussed above. At clearances greater than 0.007 inch, the quality of the cut decreases in that the liner tends to tear.

When it is desired to vary the size of the carton, the spacing between the adjacent pairs of coacting slotting heads is changed. Usually this is done by rotating the upper blades until the male blades enter into the peripheral grooves formed by the female cutting discs of the lower heads. These upper and lower slotting heads are loosened from their shafts and the upper slotting heads are moved axially on the shaft to a new position and secured there.

This changing of the spaces between the head has been facilitated heretofore by the male slotting blade extending for a full sector in the female groove at each mating position. The metal-to-metal contact required the lower head to move the same amount that the upper head moved.

It will be appreciated that the substantial clearance between male and female members could make difficult the moving of the cutters to a new location when a change in dimensions of the carton blank is required. To provide for this, a minimum portion of the blade is made substantially the same size as the distance between the peripheral grooves of the female cutting disc. Accordingly, when it is desired to change the position of the blades on their shafts, the two blades are rotated until this wider portion is between the grooves of the female blade. Thereafter, the blades can be positioned along the shafts and once secured in position, the substantial clearance between the male blade and the female blade will remain unchanged. Advantageously, the blade is tapered from this wide portion to the narrow portion so as to minimize the disturbance. Advantageously, this enlarged portion is at the front of the blade.

The above and further objects and novel features of this invention will appear more fully from the following detailed description when the same is read in connection with the accompanying drawings. It is to be expressly understood, however, that the drawings are not intended as a definition of the invention but are for the purpose of illustration only.

In the drawings wherein like parts are marked alike:

FIGURE 2 is an elevational view of a pair of the coacting rotary slotting heads of FIGURE 1;

FIGURE 3 is a plan view of the cutting edge of the male slotting blade of FIGURE 2;

FIGURE 4 is a cross-sectional view of the trailing male slotting blade segment taken substantially along lines IV—IV of FIGURE 3; and FIGURE 5 is an enlarged view showing the dimensions taken into account in providing the area for changing the position of the blades.

Figure 1:
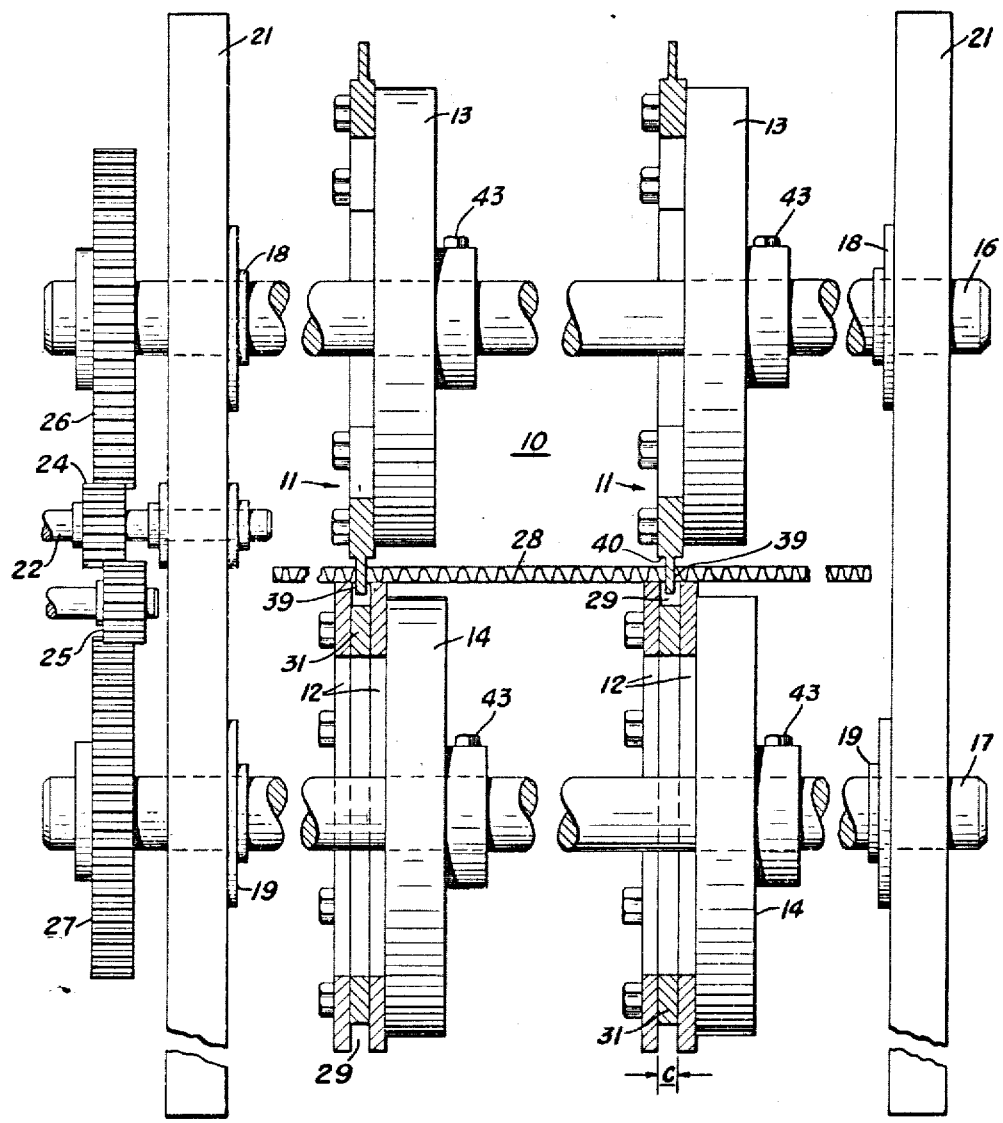
FIGURE 1 is a fragmentary end view of a rotary slotting mechanism embodying the present invention and showing the male slotting blades and female cutting discs partially in cross-section.

Referring now to FIG. 1 of the drawings, a rotary slotting mechanism, denoted generally as 10, comprises a plurality of pairs of male slotting heads 11 and female cutting discs 12 which are mounted on upper blade heads 13 and lower blade heads 14, respectively. These blade heads are fixed to and spaced lengthwise of the shafts 16 and 17. Shafts 16 and 17 are journaled in frame 21 on bearings 18 and 19. A main drive shaft 22 through spur gear 23 and a gear train including gear 24 on frame member 21, and gears 26 and 27 turns these shafts. At each revolution of the blade heads 13 and 14, the male slotting blades 11 enter into the peripheral grooves 29 defined by the annular female cutting discs 12 and the spacer rings 31 to cut the leading and trailing edges of the paperboard blanks 28.

The circumferential length of and the number of male slotting blades 11 on blade heads 13 determine the length of the slots being cut in the blank 28 and the distance between successive slots. As shown in FIG. 2, one or more of the male slotting blanks 11 are secured to blade head 13 such that the arcuate distance $a$ between the trailing and leading edges of successive male blades 11 is equal to the desired depth of the box to be formed from the blank. While three coacting pairs of male slotting blades 11 and female cutting discs 12 are conventionally used, only two such pairs are shown in FIG. 1 for simplicity of description. The six slots formed in the box blank by the male slotting blades on the three blades heads define the eight flaps which are subsequently folded over to form the top and bottom of the carton. The pairs of coacting male slotting blades 11 and female cutting discs 12 are spaced a distance from each other along the length of shafts 16 and 17 in accordance with the length and width desired for the box.

The male cutting blades are advantageously made of segments 33 secured to the lateral surface of blade head 13 by stud bolts 36. These portions, as shown in FIG. 3, are smaller than the distance between the female cutting disc so as to provide the substantial clearance between a side of the male cutting blade and the side of the female cutting disc.

For ease in locating the enlarged portion of the blade, the enlarged portion is the lead portion of the blade and is designated herein as segment 32. This segment 32 has the conventional spur shape, as shown, to start the slots to be formed in blank 28. In accordance with this invention, however, this spur portion also has the reduced dimension so as to effect a good cutting. To prevent extreme disturbance, the blade is tapered from the tip of the spur to the main broad portion 38 which is substantially the same width as the distance between the grooves of the female blade. Thus, the thickness $b$ of the portion illustrated in FIG. 3 is substantially equal to the spacing $c$, FIG. 1, between the female cutting discs 12 in an axial direction. The width of the area contact of the male knife with the female knife is made in accordance with the following formula:

$$A = \tfrac{1}{2}[r_1 l_1 - c_1(r_1 - h_1)] + \tfrac{1}{2}[r_2 l_2 - c_2(r_2 - h_2)]$$

where $A$ = contact area of tip knife and lower knife,
$l$ = length of arc,
$\alpha$ and $\beta$ = angle of contact in degrees, $$c_1 = 2\sqrt{h_1(2r_1 - h_1)} \qquad c_2 = 2\sqrt{h_2(2r_2 - h_2)}$$

$$l_1 = .01745 r_1 \alpha \qquad l_2 = .01745 r_2 \beta$$

To relocate the blade heads, the rotation of blade heads 13 and 14 is stopped with portion 38 of each male slotting blade 11 positioned between the female cutting discs 12. Then the securing means, such as tap bolts 43 and keys 44 which hold blade heads 13 and 14 to their respective shafts 16 and 17 for rotation therewith, are loosened and the blade heads 13 moved axially of shaft 16 to the desired new location either manually or by some motor driven means (not shown) well known in the present art. Since the male slotting blades 11 are entrapped between the female cutting discs 12, the movement of the male slotting blades 11 causes the blade heads 14 to move axially along with the blade heads 13 to the desired new location.

After blade heads 13 and 14 have been repositioned on their respective shafts, tap bolts 43 are tightened onto keys 44, and the slotting apparatus is ready for operation.

During continuous slotting operations, the tapered spur 37 of male slotting blade 11 enters the peripheral groove 29 in a manner obviating collision between the cutting edges of slotting blade 11 and cutting discs 12, even if slight misalignment of the cutters exists, the blade thickness of the spur is substantially less than the width of the groove 29 between the spaced female cutting discs 12. Thus, the initial entry of "lead-in" tip 37 into peripheral grooves 29 with each revolution begins without any contact between tip 37 and the cutting edges of the female cutting discs 12 rotating cooperatively therewith. Thereafter, if a misalignment should exist, the side of enlarged portion 38, which first contacts a side of the female cutting discs 12, tends to force relative lateral readjustment between discs 12, blade head 14 and shaft 17 and blade 11, blade head 13 and shaft 16. There may be a tendency for chipping of the enlarged portion due to the metal-to-metal contact, but it is so minimal as not to affect the life of the blade. The cutting arcs 39 of reduced thickness which follow immediately after non-tapered portion 38 have substantial clearance between the discs and thus are not subject to the metal-to-metal contact. In spite of the substantial clearance deliberately introduced between the sides of male cutting arc 39 and female cutting disc 12, cleaner slots are made in paperboard blanks 28 than have heretofore been produced with conventional metal-to-metal contact between the cutting edges of slotting blades 11 and cutting discs 12.

The foregoing has described a novel cutting arrangement which is particularly characterized by the long length of life of the cutting blades. Since a substantial clearance exists between the sides of the male cutting blade and the sides of the female disc, there is no wear except for that wear which results from the actual cutting of the blade. There is no metal-to-metal contact which had existed heretofore to stop chipping and dueling of the blades. Yet surprisingly, a clean cutting of the blade occurs despite this substantial clearance between the two blades. The male cutter has the conventional spur and this starts as a member narrower than the distance between the disc of the female cutter. So that the cutters can be moved from position to position on their shafts and yet maintain their same position relative to each other, the cutter is supplied with a provision for maintaining the same position of one cutter relative to another. In the embodiment illustrated herein the two positioning means are shown and this is for the purpose of balance only. Obviously, only one need be used.

I claim:

1. In an apparatus wherein cutting heads on a pair of shafts are so oriented that the slotting blade of the male head normally intermittently projects between the cutting discs of the female head during the relative rotation of the slotting heads for cutting slots in paperboard blanks, the improvement comprising a male cutting blade having a width smaller than the width between said female discs so that substantial clearance exists between the side of the disc and the blade, a spur on the leading edge of said blade of a width less than the distance between said discs, and a positioning means between said spur and said cutting blade for maintaining said male slotting blade and said cutting discs in a set relative position for movement of said heads axially of said shafts, said spur tapering toward said positioning means, said positioning means being an arcuate length of substantially rectangular cross-section having its dimension axially of said mounting shafts substantially equal to the distance between said cutting discs, and said cutting means being an arcuate length of constant substantially rectangular cross-section throughout the length thereof having its dimension in the direction axially of said mounting shafts substantially smaller than the distance between said cutting discs and the total arcuate length of said introducing means and said aligning means being small compared to the comparable arcuate length of said cutting means.

2. In rotary apparatus wherein a male blade head is secured for rotation with and adjustment lengthwise of a shaft and coacts with a female blade head in secured position on another shaft for rotation therewith and adjustment lengthwise thereof for slotting advancing webs or blanks, each of the female blade heads having rigidly spaced parallel metallic cutting discs secured adjacent the outer periphery of the hub of said female blade head, the improvement comprising first and second arcuate metallic male slotting blade segments secured adjacent the periphery of the hub of said male blade head in tandem fashion in substantially abutting relationship, said first segment having an outer arcuate length whose central portion is of constant substantially rectangular cross-section with its thickness in the direction parallel to the axis of the mounting shafts substantially equal to the distance between the cutting discs and whose leading and trailing portions taper to a thickness less than said thickness of said central portion, said second segment having its outer arcuate portion formed with a substantially rectangular constant cross-section throughout the length thereof of a thickness in the direction parallel to said axis of said mounting shafts less than the thickness of said central portion of said first male slotting blade segment so that a substantial clearance exists between the sides of the blade of said second segment and the sides of said discs.

3. An arcuate metallic male slotting blade for mounting on the hub portion of a male slotting head comprising a first male slotting blade segment and a second male slotting blade segment to be arranged in substantially abutting tandem relationship therewith, said first segment having an outer arcuate length with leading, central, and trailing portions, said central portion being of constant substantially rectangular cross-section throughout its length, said central portion tapering to said leading and trailing portions to a thickness in the direction perpendicular to the plane of mounting of said blade on said hub portion less than the comparable dimension of said central portion, said leading portion terminating in an outwardly extending spur, said second segment having an outer arcuate portion substantially longer than the arcuate length of said central portion of said first segment and of substantially rectangular constant cross-section throughout the length thereof and having a thickness in the direction perpendicular to the plane of mounting of said blade on said hub portion substantially less than the thickness of said central portion of said first segment.

4. Slotting apparatus comprising a pair of spaced parallel rotatably-driven shafts, a first slotting head mounted on one of said shafts and comprising a hub portion with a metallic male slotting blade secured adjacent the periphery of said hub portion, a second slotting head mounted on the other of said shafts and comprising a hub member and a pair of parallel spaced annular metallic cutting discs rigidly secured thereto, said slotting heads being adjustably mounted on said shafts for rotation thereby and adjustment lengthwise thereof, said male slotting blade normally projecting intermittently between said cutting discs during relative rotation of said slotting heads, means formed on one end of said male slotting blade having a first portion thereof of thickness in the direction parallel to the axis of said shafts substantially equal to the distance between said cutting discs for positioning said blades between said discs and having a second portion adjacent said first portion tapering to a thickness less than the thickness of said first portion and the portion of the remainder of the length of the blade having parallel cutting edges spaced in the direction parallel to the axis of said shafts a distance less than the thickness of said first portion whereby cutting of paperboard blanks is accomplished without metal-to-metal contact between the cutting portion of said male cutter and said female discs.

5. Slotting apparatus comprising a pair of spaced parallel rotatably-driven shafts, a first slotting head mounted on one of said shafts and comprising a hub portion with a metallic male slotting blade secured adjacent the periphery of said hub portion, a second slotting head mounted on the other of said shafts and comprising a hub member and a pair of parallel spaced annular metallic cutting discs rigidly secured thereto, said slotting heads being adjustably mounted on said shafts for rotation thereby and adjustment lengthwise thereof, said male slotting blade normally projecting intermittently between said cutting discs during relative rotation of said slotting heads, means formed on one end of said male slotting blade having a first portion thereof of thickness in the direction parallel to the axis of said shafts substantially equal to the distance between said cutting discs for positioning said blades between said discs and having a second portion adjacent said first portion tapering to a thickness less than the thickness of said first portion and the portion of the remainder of the length of the blade having parallel cutting edges spaced in the direction parallel to the axis of said shafts a distance less than the thickness of said first portion so that a clearance between the blade side and the disc side of 0.003 to 0.007 inch exists whereby cutting of paperboard blanks is accomplished without metal-to-metal contact between the cutting portion of said male cutter and said female discs.

References Cited by the Examiner

UNITED STATES PATENTS

| | | |
|---|---|---|
| 1,963,369 | 6/34 | Knowlton. |
| 3,003,403 | 10/61 | Goettsch _____ 93—58.2 |
| 3,142,216 | 7/64 | Rupnow _____ 83—678 X |

FRANK E. BAILEY, *Primary Examiner.*

BERNARD STICKNEY, *Examiner.*